United States Patent

(12) United States Patent
Yamaguchi

(10) Patent No.: US 11,066,044 B2
(45) Date of Patent: Jul. 20, 2021

(54) KEY-SHAPE DATA MANAGEMENT SYSTEM AND KEY-SHAPE DATA MANAGEMENT METHOD

(71) Applicant: DENSO CORPORATION, Kariya (JP)

(72) Inventor: Taichi Yamaguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/726,507

(22) Filed: Dec. 24, 2019

(65) Prior Publication Data

US 2020/0130647 A1  Apr. 30, 2020

Related U.S. Application Data

(63) Continuation of application No. PCT/JP2018/012622, filed on Mar. 28, 2018.

(30) Foreign Application Priority Data

Jul. 18, 2017 (JP) .............................. JP2017-139515

(51) Int. Cl.
B60R 25/24 (2013.01)
G06F 16/28 (2019.01)
(Continued)

(52) U.S. Cl.
CPC .......... B60R 25/24 (2013.01); E05B 19/0017 (2013.01); E05B 81/78 (2013.01); G06F 16/252 (2019.01); G06F 16/288 (2019.01)

(58) Field of Classification Search
CPC ...................................................... B60R 25/24
See application file for complete search history.

(56) References Cited

U.S. PATENT DOCUMENTS 8,074,481 B2 * 12/2011 Bass ....................... G07F 17/26
 70/408
9,563,885 B2 * 2/2017 Marsh .................... G06Q 20/18
(Continued)

FOREIGN PATENT DOCUMENTS

JP  2001140514 A  5/2001
JP  2002147075 A  5/2002
(Continued)

Primary Examiner — K. Wong
(74) Attorney, Agent, or Firm — Harness, Dickey & Pierce, P.L.C.

(57) ABSTRACT

A key-shape data management system includes a storage server, an acceptance server, and a transmission server. The storage server stores vehicle identification information capable of identifying a vehicle, mechanical lock identification information capable of identifying a mechanical lock mounted on the vehicle, key-shape data of a mechanical key used in combination with the mechanical lock, and information on multiple manufacturing bases capable of manufacturing the mechanical key. The acceptance server accepts a request for acquiring the mechanical key together with determining information and delivery location information indicating a delivery location of the mechanical key. The transmission server determines the vehicle identification information based on the determining information, determines the key-shape data based on the vehicle identification information, determines one of the manufacturing bases corresponding to the delivery location, and transmits the delivery location information and the key-shape data to the determined manufacturing base.

17 Claims, 12 Drawing Sheets

(51) Int. Cl.
    *G06F 16/25*     (2019.01)
    *E05B 19/00*     (2006.01)
    *E05B 81/78*     (2014.01)

(56)     References Cited

U.S. PATENT DOCUMENTS

2003/0144759 A1    7/2003   Kawai
2004/0242198 A1   12/2004   Oyagi et al.
2007/0197194 A1    8/2007   Oyagi et al.

FOREIGN PATENT DOCUMENTS

JP         3379933 B2    2/2003
JP         200351892 A    2/2003
JP         2015052242 A    3/2015

\* cited by examiner

FIG. 3

BASE DB

| BASE ID | LOCATION INFORMATION ||||| DATA TRANSMISSION ADDRESS |
| --- | --- | --- | --- | --- | --- | --- |
| | PREFECTURE INFORMATION | CITY INFORMATION | TOWN INFORMATION | ADDRESS INFORMATION | BUILDING INFORMATION | |
| k1 | e1 PREFECTURE | f1 CITY | g1 TOWN | 1-5-3 | AA BUILDING | h1 |
| k2 | | | g2 TOWN | 2-1-4 | BB BUILDING | h2 |
| k3 | | f2 CITY | g3 TOWN | 1-1-9 | CC BUILDING | h3 |
| k4 | | | g4 TOWN | 1-9-2 | DD BUILDING | h4 |
| k5 | | | g5 TOWN | 2-5-2 | — | h5 |
| k6 | | f3 CITY | g6 TOWN | 2-2-4 | EE BUILDING | h6 |
| k7 | e2 PREFECTURE | f4 CITY | g7 TOWN | 1-1-7 | FF BUILDING | h7 |
| k8 | | | g8 TOWN | 2-1-2 | — | h8 |
| k9 | | f5 CITY | g9 TOWN | 1-3-8 | GG BUILDING | h9 |

FIG. 6A

| VEHICLE ID | MECHANICAL LOCK ID | KEY-SHAPE DATA |
|---|---|---|
| b1 | c1 | d1 |
| b2 | c2 | d2 |
| ⋮ | ⋮ | ⋮ |
| b150 | c150 | d150 |
| b151 | c151 | |
| b152 | c152 | |
| b153 | c153 | |
| b154 | c154 | |
| b155 | c155 | |
| b156 | c156 | |

| VEHICLE ID | MECHANICAL LOCK ID | KEY-SHAPE DATA |
|---|---|---|
| b1 | c1 | d1 |
| b2 | c2 | d2 |
| ... | ... | ... |
| b150 | c150 | d150 |
| b151 | c151 | d151 |
| b152 | c152 | d152 |
| b153 | c153 | d153 |
| b154 | c154 | d154 |
| b155 | c155 | d155 |
| b156 | c156 | d156 |

101a

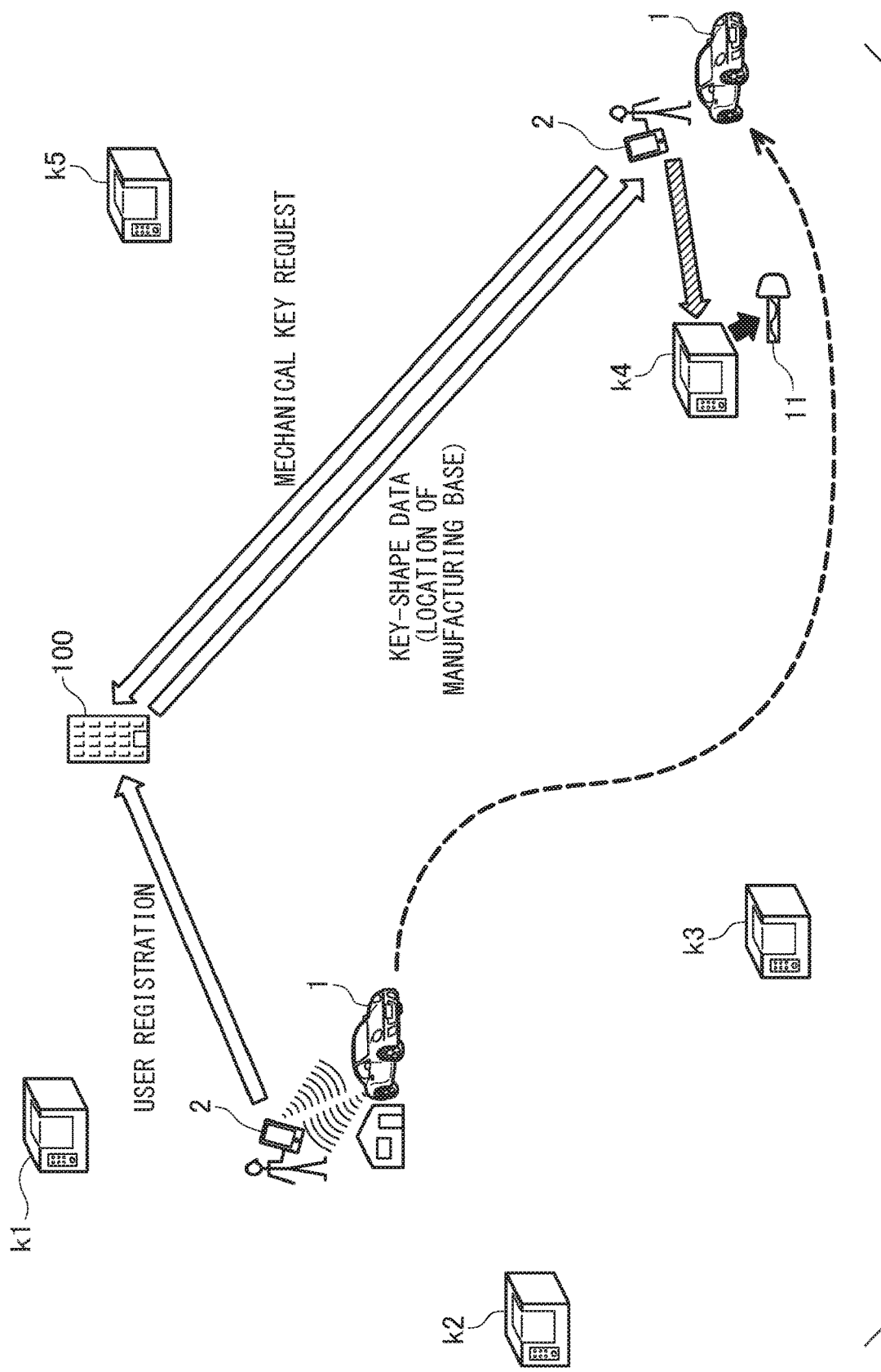

KEY-SHAPE DATA MANAGEMENT SYSTEM AND KEY-SHAPE DATA MANAGEMENT METHOD

CROSS REFERENCE TO RELATED APPLICATIONS

The present application is a continuation application of International Patent Application No. PCT/JP2018/012622 filed on Mar. 28, 2018, which designated the U.S. and claims the benefit of priority from Japanese Patent Application No. 2017-139515 filed on Jul. 18, 2017. The entire disclosures of all of the above applications are incorporated herein by reference.

TECHNICAL FIELD

The present disclosure relates to a key-shape data management system and a key-shape data management method.

BACKGROUND

In order to eliminate troublesomeness of having to pick up a key each time a door of a vehicle is unlocked, there has been developed a technique called "passive entry" in which an electronic key carried by a user is authenticated by an in-vehicle device and a door of a vehicle is unlocked automatically. In addition, there has been developed and widely used a technique in which when a user getting into a vehicle starts an engine, an in-vehicle device authenticates an electronic key of the user, thereby being capable of starting the engine by an engine start button without using a mechanical key.

With the use of the above-described techniques, the door of the vehicle can be unlocked, and further, the engine can be started without using a mechanical key.

SUMMARY

According to one aspect of the present disclosure, vehicle identification information capable of identifying a vehicle, mechanical lock identification information capable of identifying a mechanical lock mounted on the vehicle, key-shape data of a mechanical key used in combination with the mechanical lock, and information on multiple manufacturing bases capable of manufacturing the mechanical key are acquired, a request for acquiring the mechanical key is accepted together with determining information and delivery location information indicating a delivery location of the mechanical key, the vehicle identification information is determined based on the determining information and the key-shape data is determined based on the vehicle identification information, and one of the manufacturing bases corresponding to the delivery location is determined and the delivery location information and the key-shape data is transmitted to the determined manufacturing base.

According to another aspect of the present disclosure, vehicle identification capable of identifying a vehicle, mechanical lock identification information capable of identifying a mechanical lock mounted on the vehicle, key-shape data of a mechanical key used in combination with the mechanical lock are acquired, a request for acquiring the mechanical key is accepted together with determining information from an external device, the vehicle identification information is determined based on the determining information and the key-shape data is determined based on the vehicle identification information, and the determined key-shape data is transmitted to the external device that has transmitted the request for acquiring the mechanical key.

BRIEF DESCRIPTION OF DRAWINGS

Objects, features and advantages of the present disclosure will become apparent from the following detailed description made with reference to the accompanying drawings. In the drawings:

FIG. 3 is a diagram illustrating a part of a base database stored in the storage server of the key-shape data management system;

FIG. 6A is a diagram illustrating a state in which mechanical lock IDs are added in association with vehicle IDs when the vehicle database is generated;

FIG. 6B is a diagram illustrating a state in which the key-shape data are added in association with the added mechanical lock IDs when the vehicle database is generated;

FIG. 11 is a diagram illustrating how a user acquires a mechanical key of a vehicle by the key-shape data management system according to the modification.

DETAILED DESCRIPTION

Figure 1:
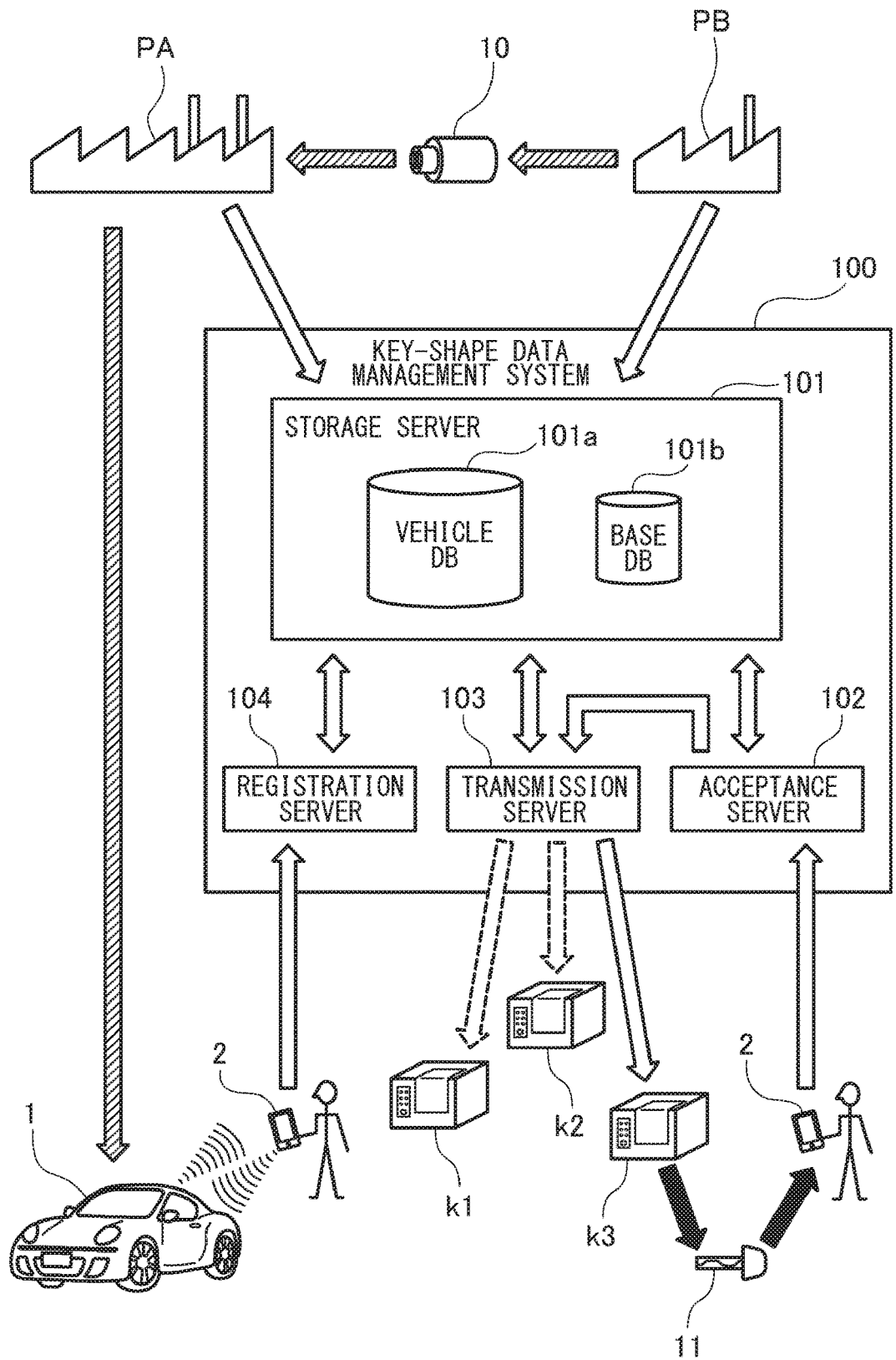
FIG. 1 is a diagram showing an outline of a key-shape data management system according to an embodiment.

In association with widespread use of portable information terminals such as so-called smartphones (hereinafter referred to as "mobile terminals"), there has also been proposed a technique that enables an in-vehicle device to unlock a door of a vehicle or start an engine by authenticating a mobile terminal carried by a user.

However, even when the mobile terminal is used as an electronic key, the user still needs to carry the electronic key.

The reason is because if a battery of the vehicle is dead, authentication by the in-vehicle device cannot be performed, and the door of the vehicle cannot be unlocked. If the door cannot be unlocked, the battery cannot be replaced. For that reason, there is a need to unlock the door with the use of a mechanical key. However, since the mechanical key is conventionally provided to the user by being incorporated in the electronic key, there is a need to carry the electronic key in preparation for a case that the battery of the vehicle is dead.

A key-shape data management system according to an aspect of the present disclosure includes a storage server, an acceptance server, and a transmission server. The storage server stores vehicle identification information assigned to a vehicle and capable of identifying the vehicle, mechanical lock identification information capable of identifying a mechanical lock mounted on the vehicle, key-shape data of a mechanical key used in combination with the mechanical lock, and information on a plurality of manufacturing bases capable of manufacturing the mechanical key. The acceptance server accepts a request for acquiring the mechanical key together with determining information used for determining the vehicle identification information and delivery location information indicating a delivery location of the mechanical key. The transmission server determines the vehicle identification information based on the determining information, determines the key-shape data based on the vehicle identification information, determines one of the manufacturing bases corresponding to the delivery location, and transmits the delivery location information and the key-shape data that is determined to the one of the manufacturing bases that is determined.

In a key-shape data management method according to another aspect of the present disclosure, vehicle identification information assigned to a vehicle and capable of identifying the vehicle and mechanical lock identification information capable of identifying a mechanical lock mounted on the vehicle are acquired in association with each other, the mechanical lock identification information and key-shape data of a mechanical key used in combination with the mechanical lock are acquired in association with each other, information on a plurality of manufacturing bases that is capable of manufacturing the mechanical key is acquired, a request for acquiring the mechanical key is accepted together with determining information used for determining the vehicle identification information and delivery location information indicating a delivery location of the mechanical key, the vehicle identification information is determined based on the determining information, the key-shape data is determined based on the vehicle identification information, one of the manufacturing bases corresponding to the delivery location is determined, and the delivery location information and the key-shape data that is determined are transmitted to the one of the manufacturing bases that is determined.

According to the key-shape data management system and the key-shape data management method described above, when a user of a vehicle need a mechanical key, the user can receive the mechanical key by requiring the key-shape data management system to acquire the mechanical key.

A key-shape data management system according to another aspect of the present disclosure includes a storage server, an acceptance server, and a transmission server. The storage server stores vehicle identification information assigned to a vehicle and capable of identifying the vehicle, mechanical lock identification information capable of identifying a mechanical lock mounted on the vehicle, and key-shape data of a mechanical key used in combination with the mechanical lock. The acceptance server accepts a request for acquiring the mechanical key together with determining information used for determining the vehicle identification information. The transmission server determines the vehicle identification information based on the determining information, determines the key-shape data based on the vehicle identification information, and transmits the key-shape data that is determined.

In a key-shape data management method according to another aspect of the present disclosure, vehicle identification information assigned to a vehicle and capable of identifying the vehicle and mechanical lock identification information capable of identifying a mechanical lock mounted on the vehicle are acquired in association with each other, the mechanical lock identification information and a key-shape data of a mechanical key used in combination with the mechanical lock are acquired in association with each other, a request for acquiring the mechanical key is accepted together with determining information used for determining the vehicle identification information from an external device, the vehicle identification information is determined based on the determining information, the key-shape data is determined based on the vehicle identification information, and the key-shape data that is determined is transmitted to the external device that has transmitted the request for acquiring the mechanical key.

Also according to the key-shape data management system and the key-shape data management method described above, when a user of a vehicle needs a mechanical key, the user can receive key-shape data for manufacturing the mechanical key by requiring the key-shape data management system to acquire the mechanical key, thereby capable of having the mechanical key manufactured based on the key-shape data.

Hereinafter, embodiments for clarifying the content of the present disclosure will be described.

FIG. 1 shows an outline of a key-shape data management system 100 according to the present embodiment. As shown in the figure, the key-shape data management system 100 includes a storage server 101, an acceptance server 102, a transmission server 103, and a registration server 104.

The storage server 101 receives data indicating a correspondence relationship between a vehicle ID and a mechanical lock ID from a vehicle manufacturing factory PA that manufactures a vehicle 1, and stores the data in a vehicle database (vehicle DB) 101a. In this example, the vehicle ID is unique identification information assigned to each individual vehicle 1. The mechanical lock ID is unique identification information assigned to each individual mechanical lock 10. The vehicle ID according to the present embodiment corresponds to "vehicle identification information" in the present disclosure, and the mechanical lock ID according to the present embodiment corresponds to "mechanical lock identification information" in the present disclosure.

The storage server 101 is also connected to a mechanical lock manufacturing factory PB that supplies the mechanical lock 10 to the vehicle manufacturing factory PA, and receives data indicating a correspondence relationship between the mechanical lock ID and key-shape data from a mechanical lock manufacturing factory PB and stores the data in the vehicle database 101a. In this example, the key-shape data is data for manufacturing the mechanical key 11 used in combination with the mechanical lock 10 having the mechanical lock ID.

The correspondence relationship between the mechanical lock ID and the key-shape data does not need to directly associate the mechanical lock ID with the key-shape data. The correspondence relationship may be a relationship in which the key-shape data corresponding to the mechanical lock ID is determined when the mechanical lock ID is determined. For example, a mechanical key ID may be associated with the mechanical lock ID, and the key-shape data may be associated with the mechanical key ID. In this example, the mechanical key ID is unique identification information assigned to each individual mechanical key 11.

The storage server 101 also stores a base database (base DB) 101b. In this example, the base database 101b is a database for multiple manufacturing bases capable of manufacturing the mechanical key 11 based on the key-shape data.

The vehicle database 101a and the base database 101b will be described in detail later.

The registration server 104 accepts a user registration by communicating with the mobile terminal 2 carried by a user of the vehicle 1, for example, a smartphone or a cellular phone, and registers the user registration in the vehicle database 101a of the storage server 101. Details of the user registration will be described later.

In addition, the mobile terminal 2 of the user is registered in the vehicle 1 in advance, and the mechanical lock 10 of the vehicle 1 can be unlocked or locked with the use of the mobile terminal 2 instead of the electronic key. Therefore, if the user carries the mobile terminal 2 registered in the vehicle 1, the user does not need to carry the electronic key. However, when the vehicle 1 cannot communicate with the mobile terminal 2, for example, because the battery of the vehicle 1 is dead, the mechanical key 11 is required to unlock the mechanical lock 10. In such a case, the user connects to the acceptance server 102.

The acceptance server 102 has a function of accepting a request for acquiring the mechanical key 11 for unlocking or locking the mechanical lock 10 of the vehicle 1 by communicating with the mobile terminal 2 or the like carried by the user of the vehicle 1. If the user has been registered through the registration server 104, the request for acquiring the mechanical key 11 can be easily accepted.

The information acquire by the acceptance server 102 from the user when accepting the request for acquiring the mechanical key 11 includes a vehicle ID of the vehicle 1 of the user and delivery location information indicating a delivery location of the mechanical key 11. Upon accepting the request for acquiring the mechanical key 11, the acceptance server 102 transfers the accepted information to the transmission server 103.

The transmission server 103 specifies key-shape data necessary for manufacturing the mechanical key 11 based on the information transferred from the acceptance server 102, and transmits the key-shape data to the manufacturing base. The key-shape data can be specified by referring to the vehicle database 101a of the storage server 101 from the vehicle ID transferred from the acceptance server 102. The manufacturing base for transmitting the key-shape data can be specified by referring to the base database 101b of the storage server 101 from the delivery location information transferred from the acceptance server 102. In the example shown in FIG. 1, among manufacturing bases k1 to k3, the key-shape data is transmitted to a manufacturing base k3 where the user can easily receive the mechanical key 11.

At the manufacturing base k3 that has received the key-shape data from the transmission server 103, the mechanical key 11 is manufactured according to the received key-shape data and delivered or handed over to the user. In this way, the user carrying the mobile terminal 2 can quickly acquire the mechanical key 11 at anytime and anywhere when the mechanical key 11 is required when the battery of the vehicle 1 is dead or the like.

Figure 2:
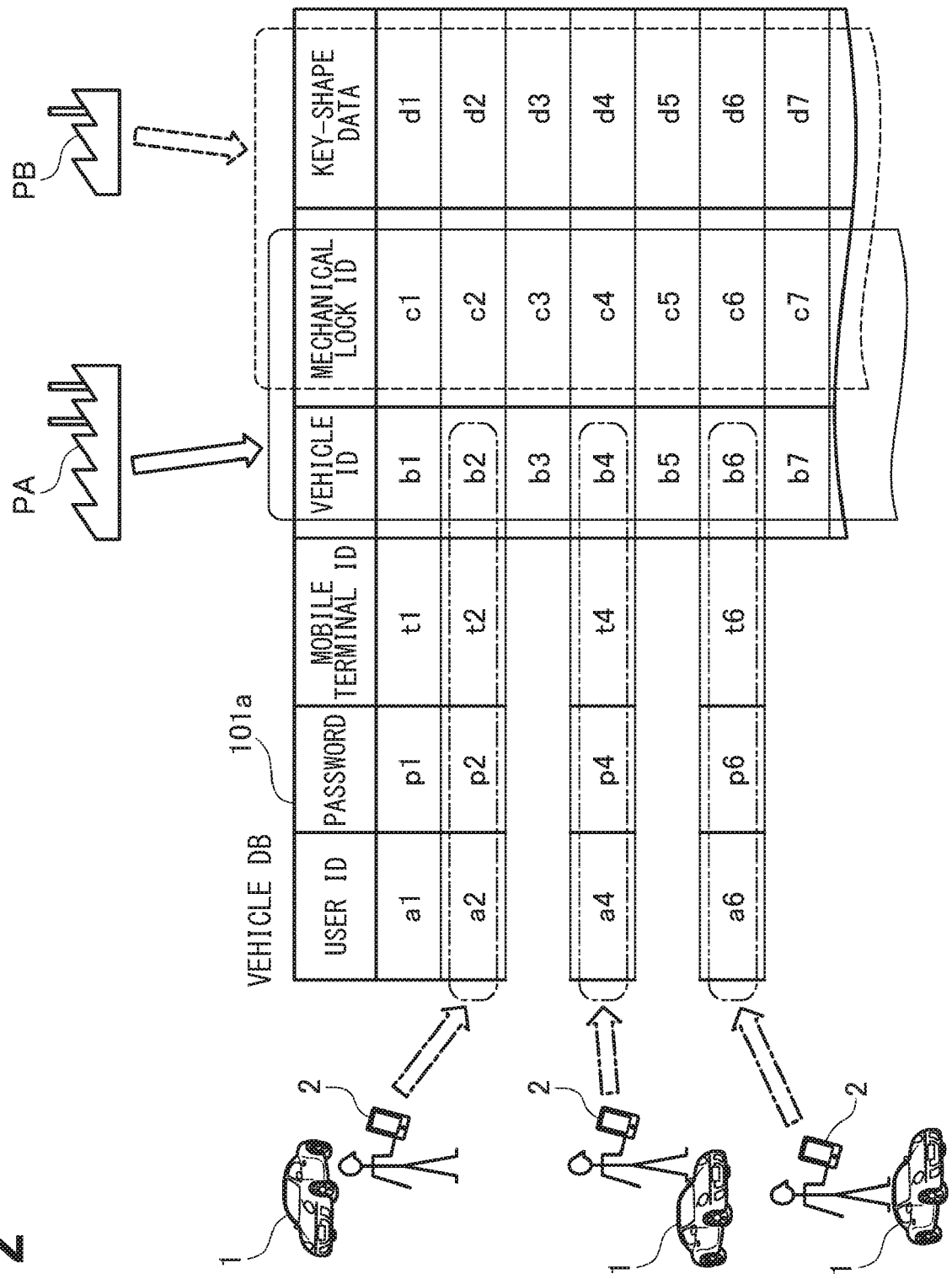
FIG. 2 is a diagram illustrating a part of a vehicle database stored in a storage server of the key-shape data management system.

FIG. 2 illustrates a part of the vehicle database 101a. As shown in the figure, the vehicle database 101a is a database in which data associated with the user registration and the like are added to data centered on a combination of the vehicle ID of the vehicle 1, the mechanical lock ID of the mechanical lock 10 mounted on the vehicle 1, and the key-shape data of the mechanical key 11 used for the mechanical lock 10. In this example, it is desirable that the vehicle ID is not information that can be easily known by a third party, such as a vehicle registration number shown on a so-called license plate, but information that can be known by the user of the vehicle 1 and is hardly known by a third party, such as a vehicle body number or an encrypted vehicle body number.

The data in which the vehicle ID of the vehicle 1 is associated with the mechanical lock ID of the mechanical lock 10 mounted on the vehicle 1 can be acquired from the vehicle manufacturing factory PA that has manufactured the vehicle 1. In addition, the data in which the mechanical lock ID of the mechanical lock 10 and the key-shape data of the mechanical key 11 used for the mechanical lock 10 are associated with each other can be acquired from the mechanical lock manufacturing factory PB that has manufactured the mechanical lock 10.

Further, the user of the vehicle 1 can register the user by registering various information including the vehicle ID of the vehicle 1, the mobile terminal ID of the mobile terminal 2 used by the user, the user ID indicating the user, the password, and the like in the vehicle database 101a. As shown in FIG. 2, those pieces of information are stored in the vehicle database 101a in a state of being linked to the vehicle ID. The mobile terminal ID according to the present embodiment corresponds to "terminal identification information" in the present disclosure, and the user ID according to the present embodiment corresponds to "user identification information" in the present disclosure.

Further, a user who can use the mobile terminal 2 instead of the electronic key by registering the mobile terminal 2 in the vehicle 1 can be easily registered with the use of the mobile terminal 2. In other words, when the mobile terminal 2 is registered in the vehicle 1, the mobile terminal 2 may acquire the vehicle ID in advance, and when the mobile terminal 2 is connected to the registration server 104 to register the user, the mobile terminal 2 may transmit the vehicle ID acquired from the vehicle 1 and the mobile terminal ID.

Further, the user ID and the password may be set by the user at the time of the user registration, or the vehicle database 101a may set the user ID and the password and may notify the user.

FIG. 3 illustrates a part of the base database 101b. As shown in the figure, the base database 101b stores a base ID, location information indicating the location of the manufacturing base, a data transmission address for transmitting the key-shape data, and the like, for each manufacturing base capable of manufacturing the mechanical key 11 based on the key-shape data. In this example, the base ID is unique identification information assigned to each individual manufacturing base. In addition, since a small NC lathe device or a so-called 3D printer is enough to manufacture the mechanical key 11, a convenience store, a gasoline station, a vehicle repair shop, a vehicle goods dealer, or the like can also be used as a manufacturing base.

As shown in FIG. 3, in the base database 101b of the present embodiment, the location information is stored in a hierarchical state. As information of the uppermost hierarchy, prefecture information indicating the "prefecture" in which the manufacturing base exists is stored. As information of the lower hierarchy, city information indicating the "city" in which the manufacturing base exists is stored, town information indicating the "town" is stored in the second lower hierarchy, and address information indicating information on the address is stored in the third lower hierarchy. Further, when the manufacturing base is occupied in a building, building information indicating the name of the building in which the manufacturing base is occupied is stored as the information of the lowest hierarchy.

For example, in the manufacturing base indicated at a top in FIG. 3 and assigned with k1 as the base ID, the prefecture information is "e1 Prefecture", the city information is "g1 City", the town information is "g1 Town", the address information is "1-5-3", and the building information is "AA Building".

As described above, since the location information is stored in the base database 101b in a hierarchical manner, it can be easily recognized that six manufacturing bases exist in "e1 Prefecture", in which two exist in "f1 City", three exist in "f2 City", and one exists in "f3 City".

The location information stored in the base database 101b of the present embodiment is hierarchized information such as prefecture information, city information, town information, and address information, but may be information that is not hierarchized, such as information that combines latitude and longitude. It is needless to say that the location information may include state information or the like instead of prefecture information.

The following describes a process of the key-shape data management system 100 according to the present embodiment exemplified in FIG. 1 for delivering the mechanical key 11 with reference to the vehicle database 101a and the base database 101b in response to a request from the user of the vehicle 1.

Figure 4:
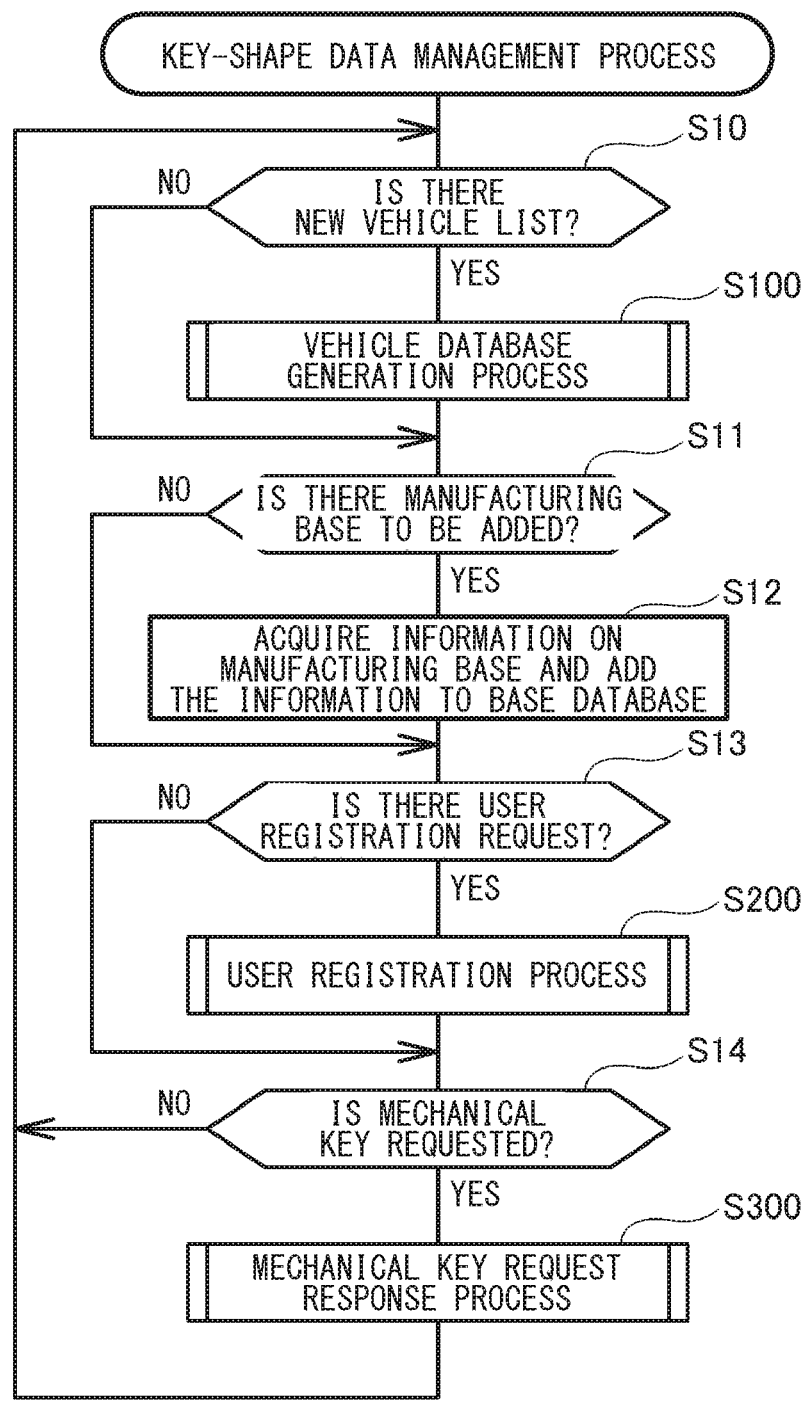
FIG. 4 is a flowchart of a key-shape data management process executed by the key-shape data management system.

FIG. 4 shows a flowchart of a key-shape data management process executed by the key-shape data management system 100 according to the present embodiment for delivering the mechanical key 11 in response to a request from the user of the vehicle 1.

As shown in the figure, in the key-shape data management process, first, the key-shape data management system 100 inquires of the vehicle manufacturing factory PA whether there is a new vehicle list (S10). The vehicle manufacturing factory PA manages the vehicle body number of the vehicle 1, the mechanical lock ID of the mechanical lock 10 attached to the vehicle 1, and the like when manufacturing the vehicle 1, and outputs a vehicle list in which the vehicle body number and the mechanical lock ID are associated with each other for the vehicle 1 that is manufactured. Therefore, in S10, it is determined whether the new vehicle list exists by inquiring of the vehicle manufacturing factory PA.

As a result, when it is determined that the new vehicle list exists (YES in S10), the vehicle database 101a as exemplified in FIG. 2 is generated by executing a vehicle database generation process (S100) which will be described later.

On the other hand, when it is determined that there is no new vehicle list (NO in S10), it is determined whether there is a manufacturing base to be added to the base database 101b (S11). In addition, after the vehicle database generation process to be described later is performed (S100) and the vehicle database 101a is generated, it is determined whether there is a manufacturing base to be added (S11).

As described above, since the mechanical key 11 can be manufactured with the use of a small NC lathe device or a so-called 3D printer, convenience stores, gas stations, and the like can be used as the manufacturing bases. Therefore, in S11, it is determined whether there is a newly installed manufacturing base, and if there is a newly installed manufacturing base (YES in S11), information about the manufacturing base, that is, the location information and the data transmission address of the manufacturing base are added to the base database 101b, and then a new base ID is set (S12).

On the other hand, when there is no new manufacturing base to be added to the base database 101b (NO in S11), it is determined whether the user registration is requested without adding a new manufacturing base to the base database 101b (S13). Further, even after a new manufacturing base is added to the base database 101b (S12), it is determined whether user registration is requested (S13).

As a result, when the user registration is requested (YES in S13), the user of the vehicle 1 is registered in the vehicle database 101a by executing a user registration process (S200) to be described later (refer to FIG. 2).

On the other hand, when the user registration is not requested (NO in S13), it is determined whether the mechanical key 11 is requested by the user of the vehicle 1 (S14). In addition, after a user registration process (S200), which will be described later, is performed to register information on the user of the vehicle 1 in the vehicle database 101a, it is determined whether the mechanical key 11 is requested by the user (S14).

As a result, when the mechanical key 11 is requested by the user (YES in S14), the request from the user is responded by executing a mechanical key request response process (S300) to be described later.

On the other hand, when the mechanical key 11 is not requested by the user (NO in S14), the process returns to the beginning of the process and it is determined whether a new vehicle list exists (S10).

The key-shape data management system 100 according to the present embodiment executes such a key-shape data management process. For that reason, the user of the vehicle 1 can quickly acquire the mechanical key 11 at anytime and anywhere when the user needs the mechanical key 11 when, for example, the battery of the vehicle 1 is dead.

Figure 5:
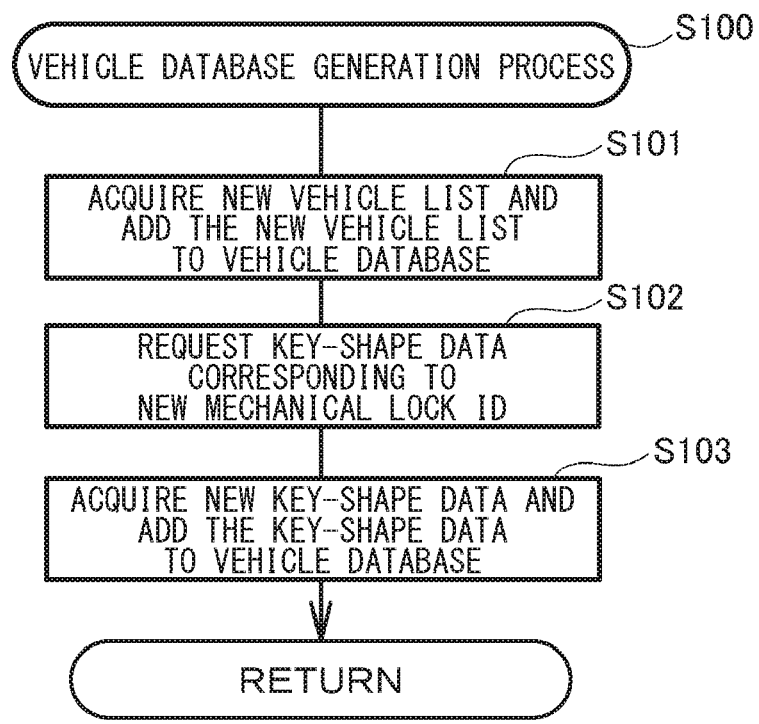
FIG. 5 is a flowchart of a vehicle database generation process executed by the key-shape data management system.

FIG. 5 shows a flowchart of the vehicle database generation process. As described above with reference to FIG. 4, this process is executed by the key-shape data management system 100 when the key-shape data management system 100 inquires of the vehicle manufacturing factory PA whether there is a new vehicle list and determines that there is the new vehicle list (YES in S10 of FIG. 4). As described above, the vehicle list is data in which the vehicle body number and the mechanical lock ID are associated with each other for the vehicle 1 manufactured in the vehicle manufacturing factory PA.

As shown in FIG. 5, when the vehicle database generation process is started, first, a new vehicle list output from the vehicle manufacturing factory PA is acquired and added to the vehicle database 101a (S101).

FIG. 6A conceptually shows a state in which the new vehicle list is added to the vehicle database 101a. The data until the vehicle ID is "b150" is data already stored in the vehicle database 101a, and combinations of the data after the vehicle ID is "b151" and the data of the mechanical lock ID associated with those vehicle IDs are data of the new vehicle list. In FIG. 6A, data of the new vehicle list is indicated with hatched lines.

In this way, when the new vehicle list has been added to the vehicle database 101a (S101 in FIG. 5), the key-shape data corresponding to the newly added mechanical lock ID is requested (S102) to the mechanical lock manufacturing factory PB. In an example shown in FIG. 6A, the newly added vehicle list includes data after "c151" as new mechanical lock IDs. Therefore, the key-shape data of the mechanical key 11 corresponding to those new mechanical lock IDs is requested to the mechanical lock manufacturing factory PB.

Thereafter, as shown in FIG. 6B, the key-shape data acquired from the mechanical lock manufacturing factory PB is added to the vehicle database 101a in association with the mechanical lock IDs stored in the vehicle database 101a (S103).

FIG. 6B conceptually shows a state in which key-shape data acquired from the mechanical lock manufacturing factory PB is added to the vehicle database 101a in association with the mechanical lock IDs newly added to the vehicle database 101a. In FIG. 6B, the combinations of the mechanical lock IDs and the key-shape data acquired from the mechanical lock manufacturing factory PB and added to the vehicle database 101a are indicated by hatched lines.

As described above, the data of the vehicle ID and the mechanical lock ID acquired from the vehicle manufacturing factory PA and the key-shape data corresponding to the mechanical lock ID acquired from the mechanical lock manufacturing factory PB are added to the vehicle database 101a, thereby being capable of generating the vehicle database 101a in which the vehicle ID and the key-shape data of the mechanical key 11 corresponding to the mechanical lock 10 mounted on the vehicle 1 are associated with each other even for the newly manufactured vehicle 1. When the new vehicle database 101a is generated in this manner, the vehicle database generation process of FIG. 5 is terminated, and the process returns to the key-shape data management process of FIG. 4.

Further, when the vehicle 1 manufactured at the vehicle manufacturing factory PA is delivered to the user and the user connects the mobile terminal 2 to the registration server 104 (refer to FIG. 1) of the key-shape data management system 100 in order to register the user, it the determination of "YES" is made in S13 of the key-shape data management process in FIG. 4, and the following user registration process (S200) is started.

Figure 7:
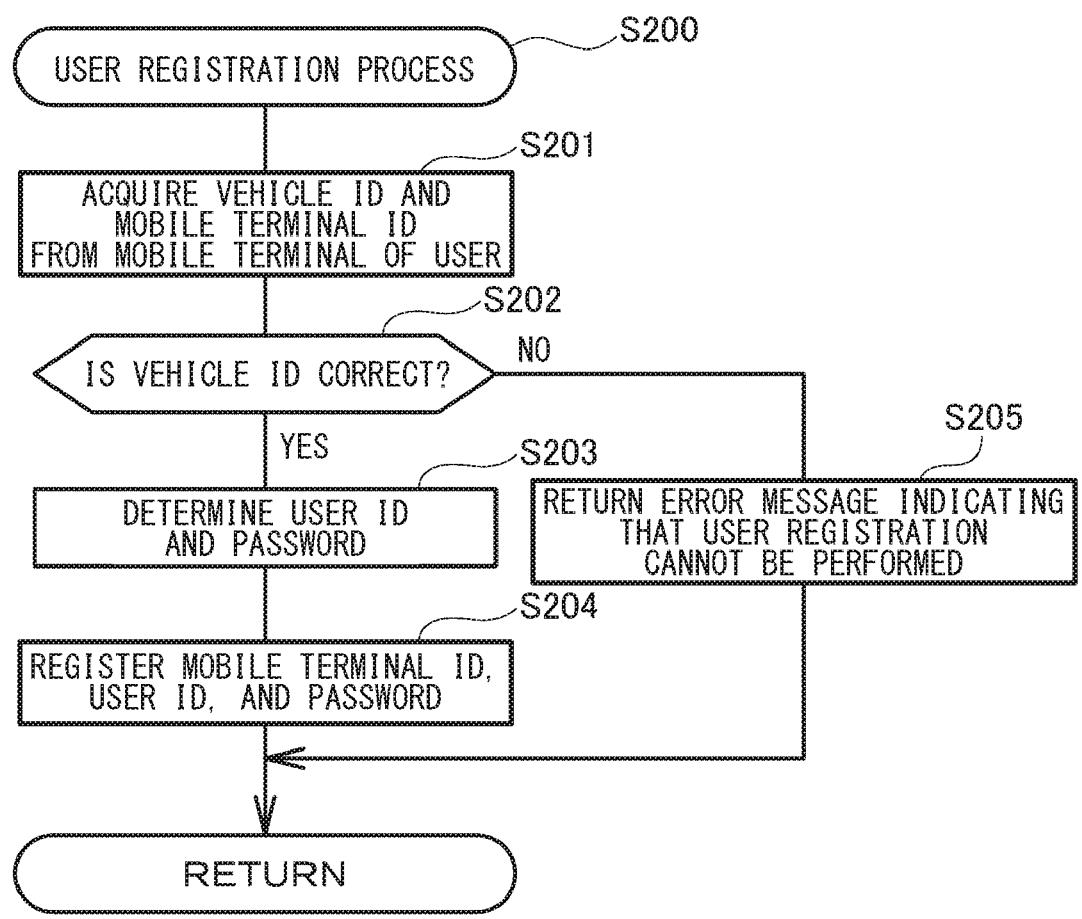
FIG. 7 is a flowchart of a user registration process executed by the key-shape data management system.

FIG. 7 shows a flowchart of the user registration process. In the user registration process, first, the vehicle ID and the mobile terminal ID are acquired from the connected mobile terminal 2 of the user (S201). As described above, the mobile terminal ID is a unique identification number assigned to each individual mobile terminal 2. The mobile terminal ID is automatically acquired from the mobile terminal 2 by the key-shape data management system 100 communicating with the mobile terminal 2. The vehicle ID can also be input by the user of the vehicle 1 operating the mobile terminal 2, but when the mobile terminal 2 is registered in the vehicle 1 in order to use the mobile terminal 2 as a substitute for the electronic key, the mobile terminal 2 may acquire the vehicle ID from the vehicle 1 at the time of registration, and the key-shape data management system 100 may acquire the vehicle ID from the mobile terminal 2.

Next, it is determined whether the acquired vehicle ID is correct (S202). As described above with reference to FIG. 2, various pieces of information subjected to the user registration is stored in association with the vehicle ID stored in the vehicle database 101a. Therefore, in order to register the user, it is assumed that the vehicle ID of the vehicle 1 to be subjected to the user registration has already been stored in the vehicle database 101a. Therefore, in S202, it is determined whether the vehicle ID acquired in S201 exists in the vehicle database 101a.

Further, when the vehicle body number is used as the vehicle ID, the vehicle registration number or the like shown on the so-called license plate cannot be easily known by a third party. However, although the vehicle body number is not visible from the outside of the vehicle 1, the vehicle body number is described in so-called vehicle verification or the like of the vehicle 1, and therefore, there is a possibility that the vehicle ID is known if a malicious third party attempts to know the vehicle body number. Therefore, when the mobile terminal 2 acquires the vehicle ID from the vehicle 1, the vehicle ID may be acquired in an encrypted state in advance, and the key-shape data management system 100 may acquire the encrypted vehicle ID from the mobile terminal 2 even when the user performs the user registration.

Furthermore, when the mobile terminal 2 is registered in the vehicle 1 and is ready to be used in place of the electronic key, the mobile terminal 2 can transmit an authentication signal to the vehicle 1. Therefore, information indicating the vehicle ID may be embedded in the authentication signal in advance, and at the time of user registration, the key-shape data management system 100 may acquire data of the authentication signal in which the vehicle ID is embedded from the mobile terminal 2.

When the acquired vehicle ID is determined to be correct by the above-described method (YES in S202), the user ID for identifying the user who has been registered and the password to be used together with the user ID are determined (S203). The key-shape data management system 100 may determine a user ID and a password which are not identical with those set for other users and notify the user of the determined user ID and password, or the user may determine the user ID and the password.

Thereafter, after the mobile terminal ID acquired in S201 and the user ID and the password determined in S203 have been registered in the vehicle database 101a in association with the vehicle ID (S204), the user registration process of FIG. 7 is terminated, and the process returns to the key-shape data management process of FIG. 4.

On the other hand, when it is determined in S202 that the vehicle ID is not correct (NO in S202), an error message indicating that the user registration cannot be performed is returned to the mobile terminal 2 (S205), the user registration process of FIG. 7 is terminated, and the process returns to the key-shape data management process of FIG. 4.

When the user of the vehicle 1 requests the mechanical key 11 to the key-shape data management system 100 in the key-shape data management process of FIG. 4 (YES in S14), the following mechanical key request response process is started (S300).

Figure 8:
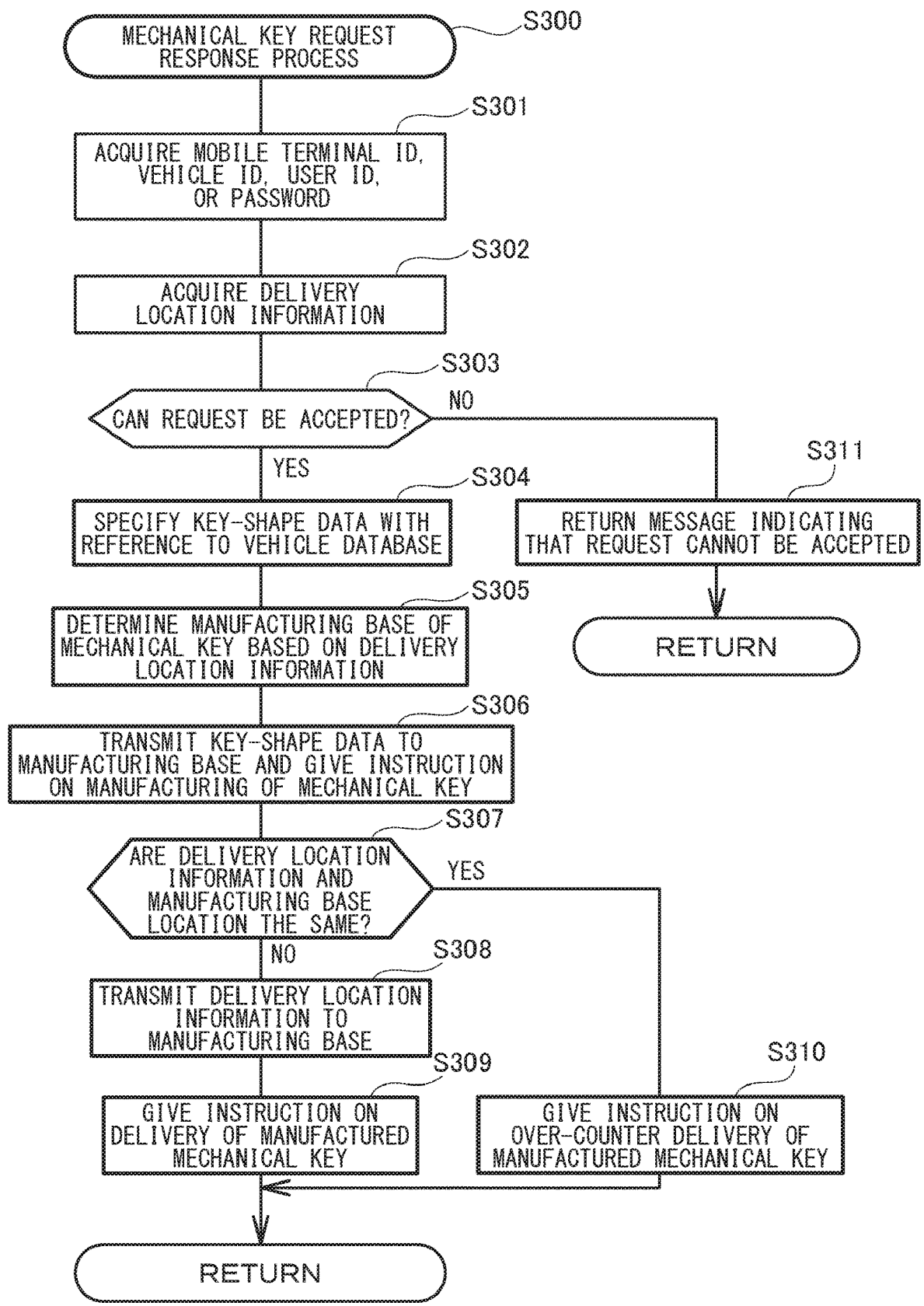
FIG. 8 is a flowchart of a mechanical key request response process executed by the key-shape data management system.

FIG. 8 shows a flowchart of the mechanical key request response process executed by the key-shape data management system 100 when the mechanical key 11 is requested by the user of the vehicle 1.

As shown in the figure, the mechanical key request response process first acquires information for determining the key-shape data of the mechanical key 11, that is, any one of the mobile terminal ID of the user, the vehicle ID, the user ID, and the password (S301).

When the user connects the key-shape data management system 100 to the mobile terminal 2, the key-shape data management system 100 can acquire the mobile terminal ID of the mobile terminal 2 by communicating with the mobile terminal 2. Therefore, if the user connects the mobile terminal 2 used at the time of the user registration to the key-shape data management system 100 the user does not need to input the mobile terminal ID again. It is needless to say that, when the user registers the mobile terminal 2 in the vehicle 1, if the mobile terminal 2 acquires and stores the vehicle ID, the key-shape data management system 100 may acquire the vehicle ID stored in the mobile terminal 2.

It is also possible that the mobile terminal 2 is replaced or lost and connected to the key-shape data management system 100 from another mobile terminal 2 or a personal computer. However, in such a case, a vehicle ID, for example, a vehicle body number, an encrypted vehicle body number, or the like, or a user ID and a password set at the time of user registration may be input. In the present disclosure, a vehicle body number, an encrypted vehicle body number, a user ID and a password set at the time of user registration, and the like correspond to an example of determining information used for determining the vehicle ID.

If any one of those pieces of information is acquired, the key-shape data for manufacturing the requested mechanical key 11 can be specified by referring to the vehicle database 101a shown in FIG. 2.

In order to specify the key-shape data of the mechanical key 11, it is sufficient to acquire any of the above-mentioned information, but a malicious third party may request the mechanical key 11 using the mobile terminal 2 of another person or may request the mechanical key 11 using the vehicle ID checked in advance. Therefore, there is no need to specify the mechanical key 11, but even when the mobile terminal ID or the vehicle ID is acquired, the user may be requested to input the password.

After the information for specifying the key-shape data used for manufacturing the mechanical key 11 has been acquired in this way (S301), the information on the delivery location of the manufactured mechanical key 11 (that is, delivery location information) is subsequently acquired (S302). In the present embodiment, the delivery location information is set by the user requesting the mechanical key 11 from a screen of the mobile terminal 2 or the like. In other words, as described above with reference to FIG. 3, the prefecture information, the city information, the town information, the address information, and the like are selected in order, for example, on the screen, and set. Alternatively, the mobile terminal 2 may automatically determine the prefecture information, the city information, the town information, the address information, and the like from the position information acquired based on a positioning signal obtained from a positioning satellite. Furthermore, the position information acquired by the mobile terminal 2 may be transmitted to the key-shape data management system 100.

As described above, when required information is acquired from the user (S301 and S302), it is determined whether the request can be accepted (S303). For example, if the mobile terminal ID can be acquired, but the mobile terminal ID is not registered in the vehicle database 101a and the vehicle ID or user ID is not entered, it is determined that the request cannot be accepted (NO in S303). If the user ID and the password are entered but at least one of the user ID and the password is not correct, it is determined that the request cannot be accepted (NO in S303).

Alternatively, even when three pieces of information, that is, the vehicle ID, the user ID, and the password, are input, but the combinations of those pieces of information do not match the contents registered in the vehicle database 101a, it is determined that the request cannot be accepted (NO in S303).

When the mobile terminal ID is automatically acquired and the user ID and the password are input by the user, the determination is made as follows.

First, when all three of the mobile terminal ID, the user ID, and the password match the contents registered in the vehicle database 101a, it is determined that the request may be accepted (YES in S303).

Next, when the mobile terminal ID does not match any of the mobile terminal IDs registered in the vehicle database 101a, but the user ID and the password match the contents registered in the vehicle database 101a, it is considered that the mobile terminal 2 has been changed, and therefore, it is determined that the request may be accepted (YES in S303).

On the other hand, when the mobile terminal ID is registered in the vehicle database 101a but the user ID and password input by the user do not match the user ID and password registered in the vehicle database 101a with respect to the mobile terminal ID, it is determined that the request cannot be accepted (NO in S303).

If the mobile terminal ID and the user ID do not match any of the mobile terminal ID and the user ID registered in the vehicle database 101a, it is determined that the request cannot be accepted regardless of whether the password matches any registered password (NO in S303).

Also, when the delivery location information set by the user or automatically acquired by the user is abnormal information, it is determined that the request cannot be accepted (NO in S303).

As described above, when it is determined that the request cannot be accepted as a result of determining whether the request from the user can be accepted (NO in S303), after a message indicating that the request cannot be accepted is returned to the user (S311), the mechanical key request response process of FIG. 8 is terminated, and the process returns to the key-shape data management process of FIG. 4.

On the other hand, when it is determined that the request from the user can be accepted (YES in S303), the key-shape data for manufacturing the requested mechanical key 11 is specified by referring to the vehicle database 101a (S304). As described above with reference to FIG. 2, if any of the mobile terminal ID, the vehicle ID, and the user ID is known, the key-shape data necessary for manufacturing the mechanical key 11 can be easily specified by referring to the vehicle database 101a.

Next, the manufacturing base of the mechanical key 11 is determined based on the delivery location information acquired in S302 (S305). In the present embodiment, similarly to the base database 101b shown in FIG. 3, since the delivery location information is also hierarchical information such as prefecture information, city information, town information, and address information, a manufacturing base close to the delivery location designated by the user can be determined by narrowing down the manufacturing bases in order of prefecture information, city information, town information, and address information from among multiple manufacturing bases registered in the base database 101b.

It is needless to say that when the mobile terminal 2 acquires the position information (for example, latitude and longitude) acquired from the positioning signal as the delivery location information, the manufacturing base may be determined by recording the position information of the manufacturing location in the base database 101b and searching for the manufacturing base with a small straight line distance to the delivery location information.

The key-shape data is transmitted to the manufacturing base determined in this way, and the mechanical key 11 is manufactured based on the key-shape data (S306). As shown in FIG. 3, since the data transmission address for transmitting the key-shape data is registered in the base database 101b for each manufacturing base, the key-shape data can be transmitted immediately when the key-shape data and the manufacturing base are determined. Although the key-shape data is transmitted in this example, instead of transmitting the key-shape data, a link for downloading the key-shape data, a password for downloading the key-shape data, or the like may be transmitted so that the user downloads the key-shape data to the mobile terminal 2.

Next, it is determined whether the delivery location information specified by the user and the location of the manufacturing base to which the key-shape data has been transmitted are the same (S307). The case where the delivery location information and the location of the manufacturing base are the same includes, for example, a case where a user who needs the mechanical key 11 designates a nearby convenience store set as a manufacturing base to a delivery location, or a case where a user needs the mechanical key 11 and rushes to a nearby repair factory, and then connects to the key-shape data management system 100 to request the mechanical key 11 from that location.

The case where the delivery location information and the location of the manufacturing base are different from each other corresponds to a case where a user who needs the mechanical key 11 connects the mobile terminal 2 to the key-shape data management system 100 and requests to deliver the mechanical key 11 to the current position.

As shown in FIG. 3, since the location of the manufacturing base is registered in the base database 101b, it can be immediately determined whether the delivery location information and the location of the manufacturing base are the same.

As a result, when the delivery location information and the location of the manufacturing base are different from each other (NO in S307), the delivery location information designated by the user is transmitted to the manufacturing base to which the key-shape data has been transmitted (S308), to instruct to deliver the manufactured mechanical key 11 to the user at the delivery location (S309). Because the mechanical key 11 is small, the mechanical key 11 can be delivered using, for example, a remotely controlled unmanned helicopter. Alternatively, since it is considered that the user of the vehicle 1 needs the mechanical key 11 in many cases that a battery of the vehicle 1 is dead and the mobile terminal 2 cannot be authenticated, the battery for replacement may also be delivered together with the mechanical key 11.

Further, when the user of the vehicle 1 requests the mechanical key 11, the user can request a battery for replacement, and when the user also requests the delivery of the battery together with the mechanical key 11, the user may select a repair shop of the vehicle or a dealer of the vehicle accessories when the user designates the manufacturing base in S305. When the manufactured mechanical key 11 is delivered, a staff of the repair shop or the dealer may deliver the mechanical key 11 with the battery for replacement. In this manner, even when the user of the vehicle 1 is not accustomed to the maintenance of the vehicle 1, the battery can be replaced.

On the other hand, when the delivery location information and the location of the manufacturing base are the same (YES in S307), the mechanical key 11 that has been manufactured is instructed to be delivered to the user at the manufacturing base (S310).

When either the delivery of the manufactured mechanical key 11 or the over-the-counter delivery is instructed in this manner (S309 and S310), the mechanical key request response process of FIG. 8 is terminated, and the process returns to the key-shape data management process of FIG. 4. Thereafter, in the key-shape data management process, the process returns to the beginning of the process, inquires of the vehicle manufacturing factory PA to determine whether there is a new vehicle list (S10), and executes the series of operations described above according to the result.

The key-shape data management system 100 according to the present embodiment executes the key-shape data management process as described above. For that reason, a user who has registered the mobile terminal 2 to the vehicle 1 to be used usable as an alternative to the electronic key can acquire the mechanical key 11 by connecting the mobile terminal 2 to the key-shape data management system 100 whenever necessary. As a result, a situation can be eliminated in which the mechanical key 11 or the electronic key in which the mechanical key 11 is housed must be carried in preparation for a very rare situation in which the battery of the vehicle 1 is dead and the mobile terminal 2 cannot be authenticated and the mechanical key 11 is required.

Figure 9:
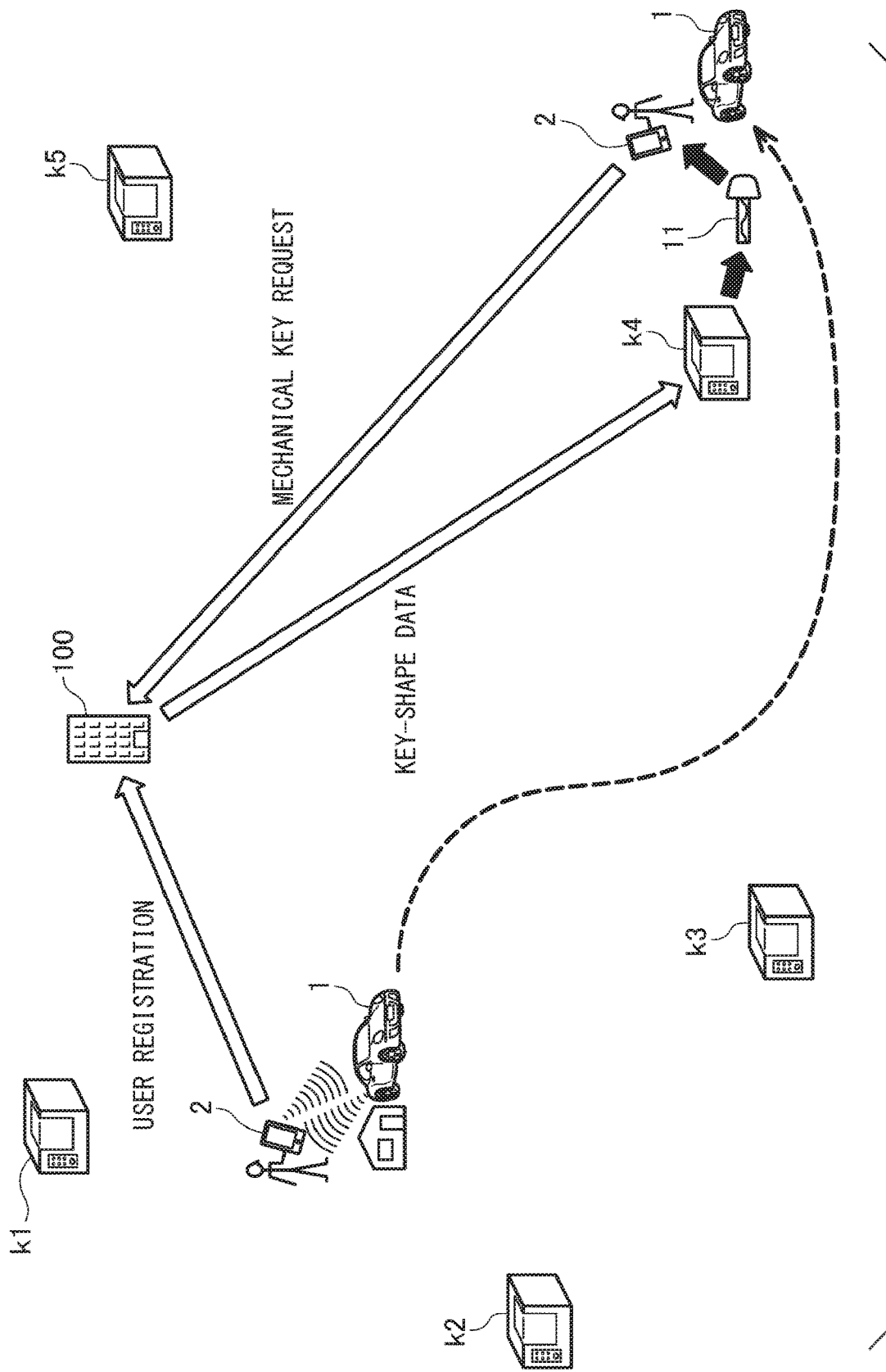
FIG. 9 is a diagram illustrating how a user acquires a mechanical key of a vehicle by the key-shape data management system.

FIG. 9 is a conceptual view showing a state in which the user of the vehicle 1 acquires the mechanical key 11 because the battery is dead when the user of the vehicle 1 goes out with the vehicle 1. In the illustrated example, the user of the vehicle 1 has been already registered by connecting the mobile terminal 2 carried from a home to the key-shape data management system 100.

After that, as indicated by a dashed line arrow in the figure, it is assumed that the battery of the vehicle 1 is dead at the place where the user goes out with the vehicle 1. Even in such a case, when the mobile terminal 2 is connected to the key-shape data management system 100 and requests the mechanical key 11, the key-shape data management system 100 specifies the key-shape data of the mechanical key 11 corresponding to the mechanical lock 10 mounted on the vehicle 1, and transmits the key-shape data to the manufacturing base (in the illustrated example, the manufacturing base k4) close to the user. Then, after the mechanical key 11 is manufactured at the manufacturing base k4 with the use of the key-shape data, the mechanical key 11 is delivered to the user. Solid arrows shown in the drawing indicate that the mechanical key 11 is delivered from the manufacturing base k4 to the user.

As described above, if the key-shape data management system 100 of the present embodiment is provided, the user of the vehicle 1 can quickly acquire the mechanical key 11 at anytime and anywhere as necessary, so that there is no need to carry the mechanical key 11 or the electronic key in which the mechanical key 11 is housed.

Further, since the user can quickly acquire the mechanical key 11 whenever necessary and wherever necessary, when the vehicle 1 is delivered to the user, the electronic key may be delivered together with the vehicle 1. Accordingly, when the vehicle 1 is shipped from the vehicle manufacturing factory PA, there is no need to ship the vehicle with the mechanical key 11 corresponding to the mechanical lock 10 mounted on the vehicle 1 and the electronic key in which the mechanical key 11 id housed. For that reason, the mechanical lock manufacturing factory PB only needs to deliver the mechanical lock 10 to the vehicle manufacturing factory PA, and furthermore, in the vehicle manufacturing factory PA, the combination of the vehicle 1 and the mechanical lock 10 has only to be managed, and therefore, there is no need to manage the combination of the mechanical lock 10 and the mechanical key 11. As a result, the cost required for manufacturing the mechanical key 11 and the cost required for managing the mechanical key 11 in association with the vehicle 1 and the mechanical lock 10 can be reduced, and therefore, the cost burden imposed on the user can also be reduced.

(Modification)

In the embodiment described above, the key-shape data management system 100 transmits the key-shape data to the manufacturing base. However, instead of transmitting to the manufacturing base, a reply may be made to the mobile terminal 2 of the user or the like that has requested the mechanical key 11. Hereinafter, a process executed by the key-shape data management system 100 according to the modification when a request for the mechanical key 11 is received from the user will be described.

Figure 10:
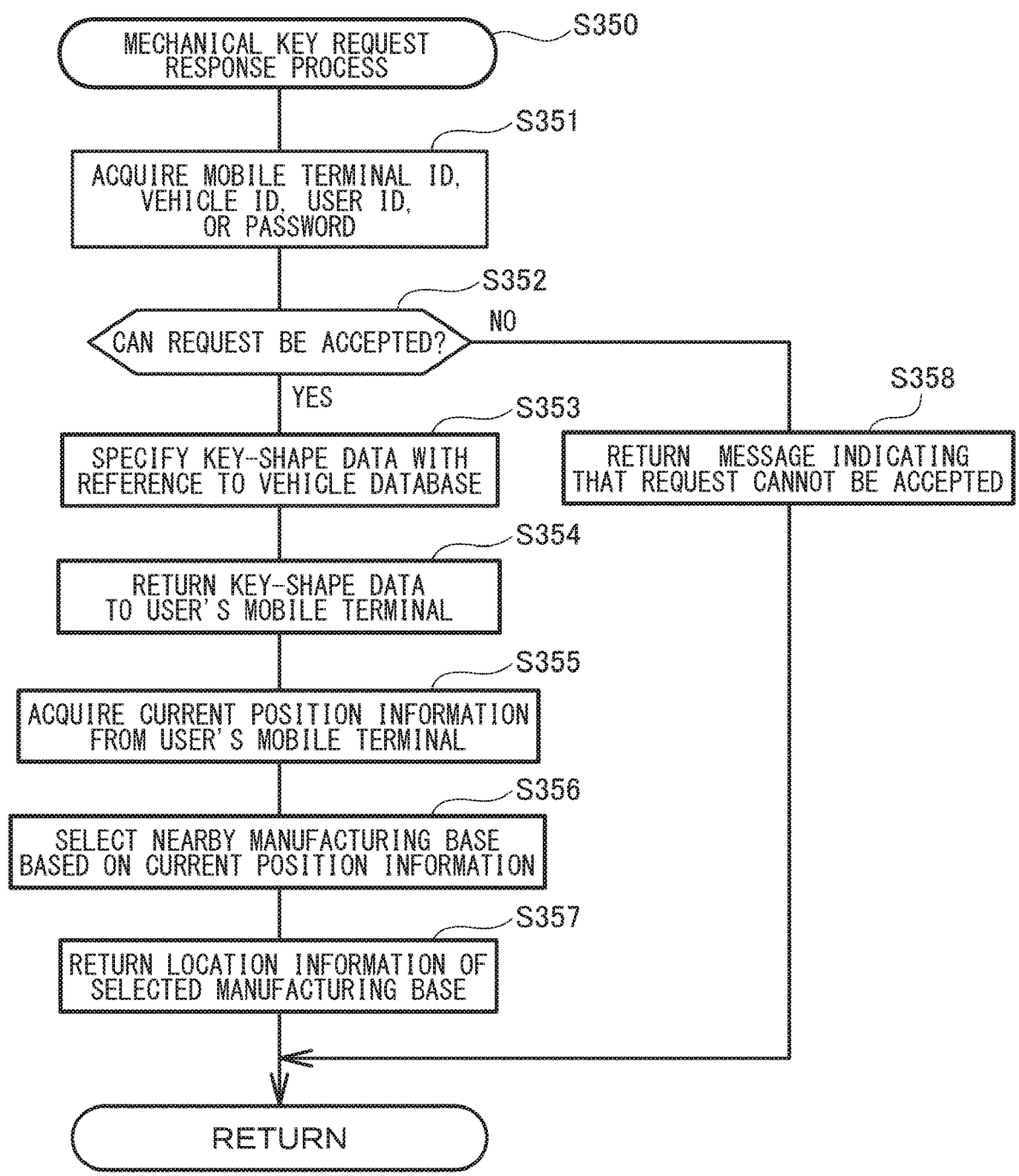
FIG. 10 is a flowchart of a mechanical key request response process executed by a key-shape data management system according to a modification.

FIG. 10 is a flowchart of the mechanical key request response process performed by a key-shape data management system 100 according to the modification. This process is a process executed in place of the mechanical key request response process (S300) in the key-shape data management process shown in FIG. 4.

As shown in FIG. 10, in the mechanical key request response process (S350) of the modification, similarly to the mechanical key request response process described above with reference to FIG. 8, when the processing is started, first, the information for determining the key-shape data of the mechanical key 11 (that is, any one of the mobile terminal ID of the user, the vehicle ID, the user ID and the password) is acquired (S351).

The mobile terminal ID can be automatically acquired by the key-shape data management system 100 by communicating with the mobile terminal 2 of the user. The user may input the vehicle ID, the user ID, and the password from the mobile terminal 2, or the key-shape data management system 100 may automatically acquire the vehicle ID, the user ID, and the password from the mobile terminal 2.

Next, it is determined whether a request from the user is accepted (S352). The determination can be made in accordance with the determination in S303 of the mechanical key request response process of FIG. 8. In other words, in the mechanical key request response process shown in FIG. 8, since the delivery location information of the manufactured mechanical key 11 is also acquired in addition to the mobile terminal ID and so on (refer to S302 in FIG. 8), it is also determined whether the delivery location information is abnormal data, but since the delivery location information is not acquired in the mechanical key request response process of the modification shown in FIG. 10, it is of course not confirmed whether the delivery location information is abnormal data. However, in other respects, in the same manner, it is determined whether a request from the user may be accepted.

For example, when the mobile terminal ID is not registered in the vehicle database 101*a* and the vehicle ID or the user ID is not input, it is determined that the request cannot be accepted. If either the user ID or the password is incorrect, it is determined that the request cannot be accepted.

As described above, when it is determined that the request cannot be accepted as a result of determining whether the request from the user can be accepted (NO in S352), after a message indicating that the request cannot be accepted is returned to the user (S358), the mechanical key request response process of the modification shown in FIG. 10 is terminated, and the process returns to the key-shape data management process of FIG. 4.

On the other hand, when it is determined that the request from the user can be accepted (YES in S352), key-shape data for manufacturing the requested mechanical key 11 is specified by referring to the vehicle database 101*a* (S353).

Then, the specified key-shape data is returned to the mobile terminal 2 of the user connected to the key-shape data management system 100 (S354). In other words, in the mechanical key request response process of the present embodiment described above with reference to FIG. 8, since the key-shape data is transmitted to the manufacturing base, there is a need to determine the manufacturing base of a transmission destination, but in the mechanical key request response process of the modification, the key-shape data is returned to the mobile terminal 2 without determining the manufacturing base. Also, in the case of the modification, instead of transmitting the key-shape data, a link for downloading the key-shape data, a password for downloading the key-shape data, or the like may be transmitted so that the user downloads the key-shape data to the mobile terminal 2.

Next, the current position information indicating the current position of the mobile terminal 2 of the user is acquired by inquiring of the mobile terminal 2 of the user (S355). As the current position information, position information (for example, latitude and longitude) acquired by the mobile terminal 2 from a positioning signal is acquired. It is needless to say that, similarly to the delivery location information of the mechanical key request response process of FIG. 8, the prefecture information, the city information, the town information, the address information, and the information of the hierarchical location may be acquired.

Then, a manufacturing base existing in the vicinity of the user is selected by referring to the base database 101*b* described above with reference to FIG. 3 based on the current position information of the mobile terminal 2 of the user (S356). At that time, the number of manufacturing bases to be selected is not necessarily one, and multiple manufacturing bases may be selected.

Thereafter, the location information on the selected manufacturing base is returned to the mobile terminal 2 of the user (S357). The location information on the manufacturing base may be information in the hierarchal form of prefecture information, city information, town information, and address information, or may be information indicating the location of the manufacturing base on a map. The mobile terminal 2 is an example of an external device.

When the key-shape data and the location information of the manufacturing base are returned to the mobile terminal 2 of the user as described above (S354 and S357), the mechanical key request response process of the modification shown in FIG. 10 is terminated, and the process returns to the key-shape data management process of FIG. 4.

Even in the case of performing the mechanical key request response process of the modification as described above, the user of the vehicle 1 can receive the key-shape data of the mechanical key 11 and the information on the location of the nearby manufacturing base by connecting the key-shape data management system 100 to the mobile terminal 2. Therefore, when the mobile terminal 2 that has received (or downloaded) the key-shape data is brought to the manufacturing base, the mechanical key 11 can be acquired quickly at any time. As a result, a situation can be eliminated in which the mechanical key 11 or the electronic key in which the mechanical key 11 is housed must be carried in preparation for a very rare situation in which the battery of the vehicle 1 is dead and the mobile terminal 2 cannot be authenticated and the mechanical key 11 is required.

Incidentally, in the mechanical key request response process of the modification described above, the description has been made on the assumption that the location information of the nearby manufacturing base is returned to the mobile terminal 2 of the user. This is because the user who has received the key-shape data can easily find the nearby manufacturing base. However, since the mechanical key 11 is a small component, a manufacturing device required for manufacturing the mechanical key 11 from the key-shape data may be a small NC lathe device, a so-called 3D printer, or the like, and a convenience store, a gas station, or the like can be easily used as the manufacturing base. Therefore, if many convenience stores and gas stations are used as the manufacturing bases and the user can easily find the manufacturing base, the location of the manufacturing base can be prevented from being transmitted to the mobile terminal 2 of the user.

FIG. 11 conceptually shows how the user of the vehicle 1 acquires the mechanical key 11 in the key-shape data management system 100 of the modification. In the example shown in FIG. 11, similarly to the case described above with reference to FIG. 9, it is assumed that the user of the vehicle 1 has already performed the user registration by connecting to the key-shape data management system 100 from the home with the use of the mobile terminal 2.

After that, as indicated by a dashed line arrow in the figure, it is assumed that the battery of the vehicle 1 is dead at the place where the user goes out with the vehicle 1. Even in such a case, when the mobile terminal 2 connects to the key-shape data management system 100 and requests the mechanical key 11, the key-shape data of the mechanical key 11 and the information on the location of the manufacturing base are returned from the key-shape data management system 100. For that reason, the mechanical key 11 can be acquired by holding the mobile terminal 2 that has received the key-shape data and going to the nearby manufacturing base. An arrow indicated by hatching in FIG. 11 conceptually represents a state in which the user who has received the key-shape data moves to a nearby manufacturing base k4. A solid arrow shown in the drawing conceptually represents a state in which the mechanical key 11 manufactured at the manufacturing base k4 is delivered to the user.

In the key-shape data management system 100 according to the above modification, since the user of the vehicle 1 can quickly acquire the mechanical key 11 at anytime and anywhere as necessary, there is no need to carry the mechanical key 11 or the electronic key in which the mechanical key 11 is housed.

In addition, when the vehicle 1 is delivered to the user, it is sufficient to deliver the electronic key together with the vehicle 1, so that the cost of manufacturing the mechanical key 11 and the cost of controlling the mechanical key 11 in association with the vehicle 1 and the mechanical lock 10 can be reduced.

Although the present disclosure has been described in accordance with the examples, it is understood that the present disclosure is not limited to such examples or structures. The present disclosure encompasses various modifications and variations within the scope of equivalents. In addition, various combinations and forms, as well as other combinations and forms including only one element, more than that, or less, among them, fall within the scope and concept of the present disclosure.

What is claimed is:

1. A key-shape data management system comprising:
   a storage server that stores vehicle identification information assigned to a vehicle and capable of identifying the vehicle, mechanical lock identification information capable of identifying a mechanical lock mounted on the vehicle, key-shape data of a mechanical key used in combination with the mechanical lock, and information on a plurality of manufacturing bases capable of manufacturing the mechanical key;
   an acceptance server that accepts a request for acquiring the mechanical key together with determining information used for determining the vehicle identification information and delivery location information indicating a delivery location of the mechanical key; and
   a transmission server that determines the vehicle identification information based on the determining information, determines the key-shape data based on the vehicle identification information, determines one of the manufacturing bases corresponding to the delivery location, and transmits the delivery location information and the key-shape data that is determined to the one of the manufacturing bases that is determined, wherein
   the storage server stores the vehicle identification information, the mechanical lock identification information, and the key-shape data in a state where the vehicle identification information, the mechanical lock identification information, and the key-shape data are associated with each other based on a correspondence relationship between the vehicle identification information and the mechanical lock identification information that are associated with each other when the vehicle is manufactured and a correspondence relationship between the mechanical lock identification information and the key-shape data that are associated with each other when the mechanical lock is manufactured.

2. The key-shape data management system according to claim 1, further comprising:
   a registration server that acquires user identification information for identifying a user of the vehicle together with the vehicle identification information assigned to the vehicle and registers the user identification information and the vehicle identification information in the storage server, wherein
   the acceptance server accepts the user identification information as the determining information.

3. The key-shape data management system according to claim 1, wherein
   the acceptance server accepts the vehicle identification information as the determining information.

4. The key-shape data management system according to claim 1, wherein
   the storage server is configured to receive a data indicating the correspondence relationship between the vehicle identification information and the mechanical lock identification information from a vehicle manufacturing factory that manufactures the vehicle and receive a data indicating correspondence relationship between the mechanical lock identification information and the key-shape data from a mechanical lock manufacturing factory that manufactures the mechanical lock.

5. A key-shape data management system comprising:
   a storage server that stores vehicle identification information assigned to a vehicle and capable of identifying the vehicle, mechanical lock identification information capable of identifying a mechanical lock mounted on the vehicle, and key-shape data of a mechanical key used in combination with the mechanical lock;
   an acceptance server that accepts a request for acquiring the mechanical key together with determining information used for determining the vehicle identification information; and
   a transmission server that determines the vehicle identification information based on the determining information, determines the key-shape data based on the vehicle identification information, and transmits the key-shape data that is determined, wherein
   the storage server stores the vehicle identification information, the mechanical lock identification information, and the key-shape data in a state where the vehicle identification information, the mechanical lock identification information, and the key-shape data are associated with each other based on a correspondence relationship between the vehicle identification information and the mechanical lock identification information that are associated with each other when the vehicle is manufactured and a correspondence relationship between the mechanical lock identification information and the key-shape data that are associated with each other when the mechanical lock is manufactured.

6. The key-shape data management system according to claim 5, wherein
the acceptance server accepts the vehicle identification information as the determining information.

7. The key-shape data management system according to claim 5, further comprising:
a registration server that acquires user identification information for identifying a user of the vehicle together with the vehicle identification information assigned to the vehicle and registers the user identification information and the vehicle identification information in the storage server, wherein
the acceptance server accepts the user identification information as the determining information.

8. The key-shape data management system according to claim 5, wherein
the storage server is configured to receive a data indicating the correspondence relationship between the vehicle identification information and the mechanical lock identification information from a vehicle manufacturing factory that manufactures the vehicle and receive a data indicating correspondence relationship between the mechanical lock identification information and the key-shape data from a mechanical lock manufacturing factory that manufactures the mechanical lock.

9. A key-shape data management method comprising:
acquiring vehicle identification information that is assigned to a vehicle and is capable of identifying the vehicle and mechanical lock identification information that is capable of identifying a mechanical lock mounted on the vehicle in association with each other;
acquiring the mechanical lock identification information and key-shape data of a mechanical key used in combination with the mechanical lock in association with each other;
acquiring information on a plurality of manufacturing bases that is capable of manufacturing the mechanical key;
accepting a request for acquiring the mechanical key together with determining information used for determining the vehicle identification information and delivery location information indicating a delivery location of the mechanical key;
determining the vehicle identification information based on the determining information and determining the key-shape data based on the vehicle identification information; and
determining one of the manufacturing bases corresponding to the delivery location, and transmitting the delivery location information and the key-shape data that is determined to the one of the manufacturing bases that is determined, wherein
the acquiring the vehicle identification information and the mechanical lock identification information in association with each other includes acquiring a correspondence relationship between the vehicle identification information and the mechanical lock identification information that are associated with each other when the vehicle is manufactured, and
the acquiring the mechanical lock identification information and the key-shape data in association with each other includes acquiring a correspondence relationship between the mechanical lock identification information and the key-shape data that are associated with each other when the mechanical lock is manufactured.

10. The key-shape data management method according to claim 9, wherein
the acquiring the vehicle identification information and the mechanical lock identification in association with each other includes receiving a data indicating the correspondence relationship between the vehicle identification information and the mechanical lock identification information from a vehicle manufacturing factory that manufactures the vehicle, and
the acquiring the mechanical lock identification information and the key-shape data in association with each other includes receiving a data indicating the correspondence relationship between the mechanical lock identification information and the key-shape data from a mechanical lock manufacturing factory that manufactures the mechanical lock.

11. A key-shape data management method comprising:
acquiring vehicle identification information that is assigned to a vehicle and is capable of identifying the vehicle and mechanical lock identification information that is capable of identifying a mechanical lock mounted on the vehicle in association with each other;
acquiring the mechanical lock identification information and key-shape data of a mechanical key used in combination with the mechanical lock in association with each other;
accepting a request for acquiring the mechanical key together with determining information used for determining the vehicle identification information from an external device;
determining the vehicle identification information based on the determining information and determining the key-shape data based on the vehicle identification information; and
transmitting the key-shape data that is determined to the external device that has transmitted the request for acquiring the mechanical key, wherein
the acquiring the vehicle identification information and the mechanical lock identification information in association with each other includes acquiring a correspondence relationship between the vehicle identification information and the mechanical lock identification information that are associated with each other when the vehicle is manufactured, and
the acquiring the mechanical lock identification information and the key-shape data in association with each other includes acquiring a correspondence relationship between the mechanical lock identification information and the key-shape data that are associated with each other when the mechanical lock is manufactured.

12. The key-shape data management method according to claim 11, wherein
the acquiring the vehicle identification information and the mechanical lock identification in association with each other includes receiving a data indicating the correspondence relationship between the vehicle identification information and the mechanical lock identification information from a vehicle manufacturing factory that manufactures the vehicle, and the acquiring the mechanical lock identification information and the key-shape data in association with each other includes receiving a data indicating the correspondence relationship between the mechanical lock identification information and the key-shape data from a mechanical lock manufacturing factory that manufactures the mechanical lock.

13. A key-shape data management system comprising:

a storage server that stores vehicle identification information assigned to a vehicle and capable of identifying the vehicle, mechanical lock identification information capable of identifying a mechanical lock mounted on the vehicle, key-shape data of a mechanical key used in combination with the mechanical lock, and information on a plurality of manufacturing bases capable of manufacturing the mechanical key;

an acceptance server that accepts a request for acquiring the mechanical key together with determining information used for determining the vehicle identification information and delivery location information indicating a delivery location of the mechanical key;

a transmission server that determines the vehicle identification information based on the determining information, determines the key-shape data based on the vehicle identification information, determines one of the manufacturing bases corresponding to the delivery location, and transmits the delivery location information and the key-shape data that is determined to the one of the manufacturing bases that is determined; and a registration server that acquires user identification information for identifying a user of the vehicle together with the vehicle identification information assigned to the vehicle and registers the acquired identification information and the vehicle identification information in the storage server, wherein the acceptance server accepts the user identification information as the determining information, the registration server acquires the vehicle identification information by communicating with a mobile terminal carried by the user of the vehicle, and acquires terminal identification information assigned to the mobile terminal as the user identification information, the acceptance server accepts the request for acquiring the mechanical key by communicating with the mobile terminal, and acquires the terminal identification information as the user identification information at a time of accepting the request for the mechanical key, and the storage server stores the vehicle identification information, the mechanical lock identification information, and the key-shape data in a state where the vehicle identification information, the mechanical lock identification information, and the key-shape data are associated with each other based on a correspondence relationship between the vehicle identification information and the mechanical lock identification information that are associated with each other when the vehicle is manufactured and a correspondence relationship between the mechanical lock identification information and the key-shape data that are associated with each other when the mechanical lock is manufactured.

14. The key-shape data management system according to claim 13, wherein the mobile terminal is registered in the vehicle to be capable of being authenticated by the vehicle, and acquires the vehicle identification information from the vehicle when the mobile terminal is registered, the registration server acquires the vehicle identification information stored in the mobile terminal when communicating with the mobile terminal and acquiring the terminal identification information as the user identification information, and the acceptance server acquires the terminal identification information of the mobile terminal as the user identification information when communicating with the mobile terminal and accepting the request for acquiring the mechanical key.

15. The key-shape data management system according to claim 13, wherein the storage server is configured to receive a data indicating the correspondence relationship between the vehicle identification information and the mechanical lock identification information from a vehicle manufacturing factory that manufactures the vehicle and receive a data indicating correspondence relationship between the mechanical lock identification information and the key-shape data from a mechanical lock manufacturing factory that manufactures the mechanical lock.

16. A key-shape data management system comprising:

a storage server that stores vehicle identification information assigned to a vehicle and capable of identifying the vehicle, mechanical lock identification information capable of identifying a mechanical lock mounted on the vehicle, key-shape data of a mechanical key used in combination with the mechanical lock, and information on a plurality of manufacturing bases capable of manufacturing the mechanical key;

an acceptance server that accepts a request for acquiring the mechanical key together with determining information used for determining the vehicle identification information and delivery location information indicating a delivery location of the mechanical key; and a transmission server that determines the vehicle identification information based on the determining information, determines the key-shape data based on the vehicle identification information, determines one of the manufacturing bases corresponding to the delivery location, and transmits the delivery location information and the key-shape data that is determined to the one of the manufacturing bases that is determined, wherein the acceptance server receives the vehicle identification information as the determining information, the acceptance server accepts the request for acquiring the mechanical key by communicating with a mobile terminal carried by a user of the vehicle, and acquires the vehicle identification information acquired and stored by the mobile terminal by communicating with the vehicle at a time of accepting the request for acquiring the mechanical key, and the storage server stores the vehicle identification information, the mechanical lock identification information, and the key-shape data in a state where the vehicle identification information, the mechanical lock identification information, and the key-shape data are associated with each other based on a correspondence relationship between the vehicle identification information and the mechanical lock identification information that are associated with each other when the vehicle is manufactured and a correspondence relationship between the mechanical lock identification information and the key-shape data that are associated with each other when the mechanical lock is manufactured.

17. The key-shape data management system according to claim 16, wherein
the storage server is configured to receive a data indicating the correspondence relationship between the vehicle identification information and the mechanical lock identification information from a vehicle manufacturing factory that manufactures the vehicle and receive a data indicating correspondence relationship between the mechanical lock identification information and the key-shape data from a mechanical lock manufacturing factory that manufactures the mechanical lock.

* * * * *